(12) United States Patent
Hu (10) Patent No.: US 8,107,020 B2
(45) Date of Patent: Jan. 31, 2012

(54) COLOR-BASED MICRODEVICE OF LIQUID CRYSTAL ON SILICON (LCOS) MICRODISPLAY

(75) Inventor: Darwin Hu, San Jose, CA (US)

(73) Assignees: Wuhan Splendid Optronics Technology Co., Ltd., Wuhan (CN); Worship holdings limited (VG)

( * ) Notice: Subject to any disclaimer, the term of this patent is extended or adjusted under 35 U.S.C. 154(b) by 1053 days.

(21) Appl. No.: 12/014,062

(22) Filed: Jan. 14, 2008

(65) Prior Publication Data

US 2009/0180061 A1   Jul. 16, 2009

(51) Int. Cl.
*G02F 1/1335* (2006.01)
(52) U.S. Cl. .............. 349/5; 349/6; 349/7; 349/8; 349/9
(58) Field of Classification Search .......................... None
See application file for complete search history.

(56) References Cited

U.S. PATENT DOCUMENTS

| | | | | |
|---|---|---|---|---|
| 5,144,288 | A | * | 9/1992 | Hamada et al. ............... 349/109 |
| 5,311,337 | A | * | 5/1994 | McCartney, Jr. ............... 349/145 |
| 7,396,130 | B2 | * | 7/2008 | Chen et al. ...................... 353/31 |

* cited by examiner

*Primary Examiner* — Thanh-Nhan P. Nguyen
(74) *Attorney, Agent, or Firm* — Joe Zheng (57) ABSTRACT

The invention pertains to an improved LCOS microdevice that eliminates colored lights required generally in a prior art system. According to one aspect of the present invention, the LCOS structure uses color filters directly in the LCOS chip. Depending on the number of colors being used, the color filters are arranged repeatedly according to a predefined pattern across an entire LCOS chip to coincide with pixels in the microdevice. When a white light is focused onto the LCOS microdevice, it reflects a color image that is then magnified and projected onto a display screen.

14 Claims, 6 Drawing Sheets

COLOR-BASED MICRODEVICE OF LIQUID CRYSTAL ON SILICON (LCOS) MICRODISPLAY

BACKGROUND OF THE INVENTION

1. Field of the Invention

The present invention is related to the area of display devices. More particularly, the present invention is related to Liquid Crystal on Silicon (LCOS) microdevice with color filters so that a corresponding reflective lighting optical system can be simplified.

2. Description of the Related Art

Instead of using liquid crystal between two polarized panels like an LCD (liquid crystal display), an LCOS (Liquid Crystal on Silicon) microdevice has a liquid crystal layer between one transparent thin-film transistor (TFT) and one silicon semiconductor. The semiconductor has a reflective and pixilated surface. The lamp shines light through a polarizing filter and onto the device, and the liquid crystals act like gates or valves, controlling the amount of light that reaches the reflective surface. The more voltage a particular pixel's crystal receives, the more light the crystal allows to pass. It takes several layers of different materials to do this.

In general, LCOS devices have only a very small gap between pixels. The pixel pitch—the horizontal distance between one pixel and the next pixel of the same color—is between 8 and 20 microns ($10^{-6}$). LCOS technology can produce much higher resolution images than liquid crystal display and plasma display technologies, which makes it less expensive to implement in such devices as televisions.

An LCOS microdevice has a liquid crystal layer between one transparent thin-film transistor (TFT) and one silicon semiconductor. The semiconductor has a reflective, pixilated surface. The lamp shines light through a polarizing filter and onto the device, and the liquid crystals act like gates or valves, controlling the amount of light that reaches the reflective surface. The more voltage the crystal of a particular pixel receives, the more light the crystal allows to pass. It takes several layers of different materials to do this. In general, there are a printed circuit board (PCB) carrying instructions and electricity from the television to the device, a silicon chip controlling the liquid crystal, generally with one transistor per pixel, using data from the television's pixel drivers, a reflective coating reflecting the light to create a picture, a liquid crystal layer controlling the amount of light that reaches and leaves the reflective coating, an alignment layer keeping the liquid crystals properly aligned so they can direct the light accurately, a transparent electrode completing the circuit with the silicon and the liquid crystal, and a glass cover protecting and sealing the entire microdevice.

There are in general two broad categories of LCOS displays: three-panel and single-panel. In three-panel designs, there is one display chip per color, and the images are combined optically. In single-panel designs, one display chip shows the red, green, and blue components in succession with the observer's eyes relied upon to combine the color stream. As each color is presented, a color wheel (or an RGB LED array) illuminates the display with only red, green or blue light. If the frequency of the color fields is lower than about 540 Hz, an effect called color breakup is seen, where false colors are briefly perceived when either the image or the observer's eye is in motion. While less expensive; single-panel projectors require higher-speed display elements to process all three colors during a single frame time, and the need to avoid color breakup makes further demands on the speed of the display technology.

Figure 1:
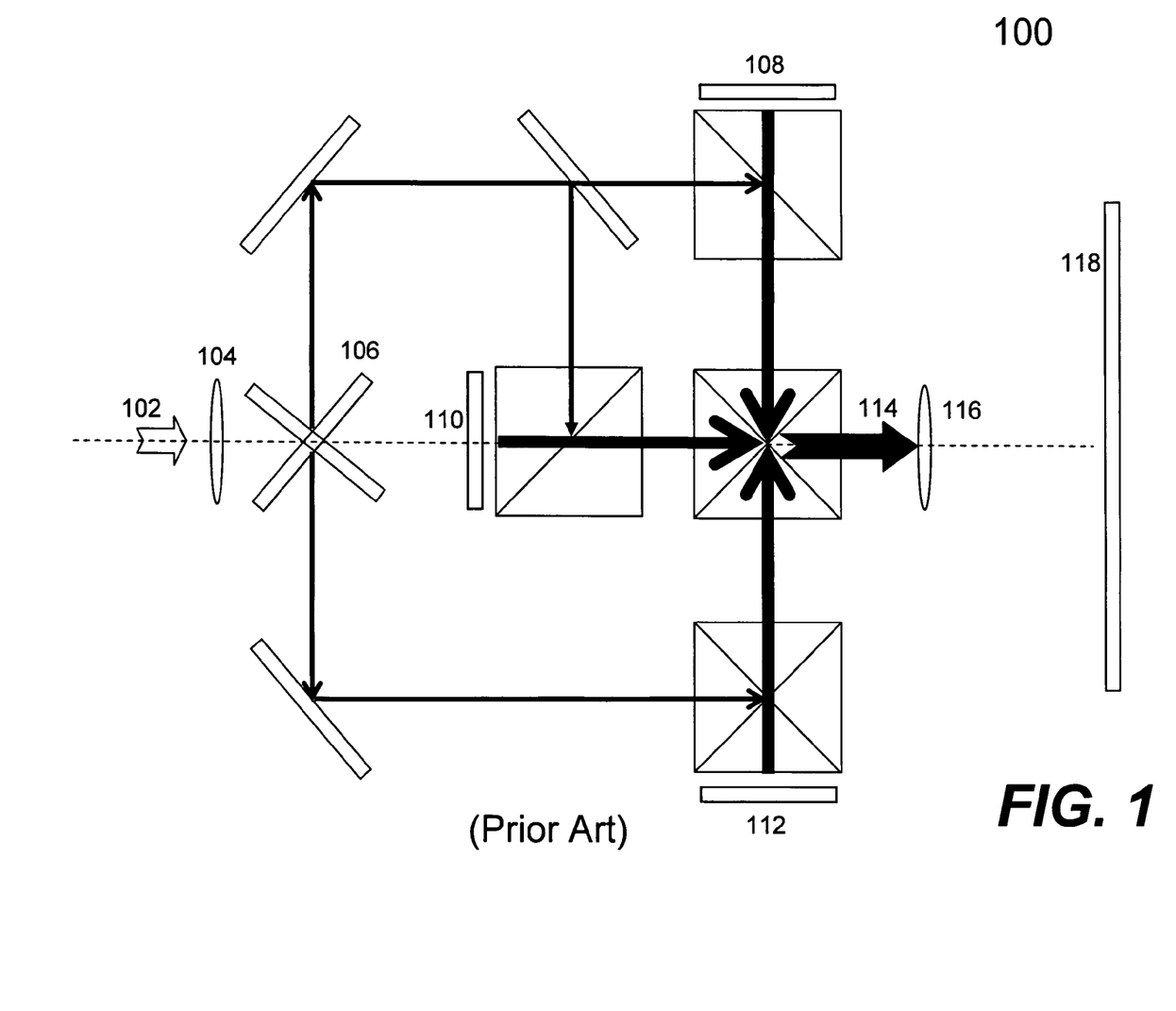
FIG. 1 shows a prior art LCOS system including three LCOS microdevices and an optical engine to form an image from the three LCOS microdevices.

FIG. 1 shows a prior art LCOS system 100 including three LCOS microdevices and an optical engine to form an image from the three LCOS microdevices. A lamp (not shown) produces a beam of white light that passes through a condenser lens. The light is focused and directed to pass through a filter 104 that only allows visible light to pass through, which helps protect the other components. The filtered white light passes through a series of dichroic mirrors 106 that reflect some wavelengths while allowing the rest of the light to pass through. For example, the dichroic mirror 106 can separate red light from the white light, leaving blue and green, and a second mirror can separate the green light, leaving only blue. The newly created beams of colored light simultaneously come into contact with one of three LCOS microdevices 108, 110 and 112—one each for red, green and blue. The reflected lights from the respective microdevices 108, 110 and 102 pass through a prism 114 that combines the lights and creates a full-color image 114. A projection lens 116 is provided and magnifies the image 114 and projects it on the screen 118.

As shown in FIG. 1, the optical engine is mechanically complicated, requiring a lot of manual calibrations to ensure that three reflected images are precisely coincident. If one optical component is off some alignment, a distorted color could be perceived.

There is a need for LCOS microdevices that would require the optical engine less complicated.

SUMMARY OF THE INVENTION

This section is for the purpose of summarizing some aspects of the present invention and to briefly introduce some preferred embodiments. Simplifications or omissions in this section as well as in the abstract and the title may be made to avoid obscuring the purpose of this section, the abstract and the title. Such simplifications or omissions are not intended to limit the scope of the present invention.

The invention pertains to an improved LCOS microdevice that eliminates colored lights required generally in a prior art system. According to one aspect of the present invention, the LCOS structure uses color filers directly in the LCOS chip. Depending on the number of colors being used, the color filters are arranged repeatedly according to a predefined pattern across an entire LCOS chip in the microdevice. When a white light is focused onto the LCOS microdevice, it reflects a color image that is then magnified and projected onto a display screen.

According to another aspect of the present invention, a group pixel includes pixels covered by each set of the color filters. The sizes of the pixels (e.g., width and height) are limited by a predefined size of the group pixel. To compensate for the brightness of a display image due to the smaller pixels, a video or image controller is employed. The controller includes at least three buffers, each for driving one type of pixels. In one embodiment, a frame of video in three different colors is buffered respectively in three buffers that drive at the same time the LCOS chip more than once (e.g., twice or three times). As a result, the image being projected on the display screen is shown more than once, resulting in accumulatively brighter display perceived by human eyes.

The present invention may be implemented as a method, a system or part of a system. According to one embodiment, the present invention is an LCOS system comprising an LCOS microdevice including an array of group pixels, each of the group pixels including three pixels respectively covered by three types of color filters; and an optical engine receiving a white light and projecting the white light onto the LCOS microdevice that reflects a color image, the optical engine projecting the color image onto a display screen.

The foregoing and other objects, features and advantages of the invention will become more apparent from the following detailed description of a preferred embodiment, which proceeds with reference to the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

The detailed description of the invention is presented largely in terms of procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Figure 2A:
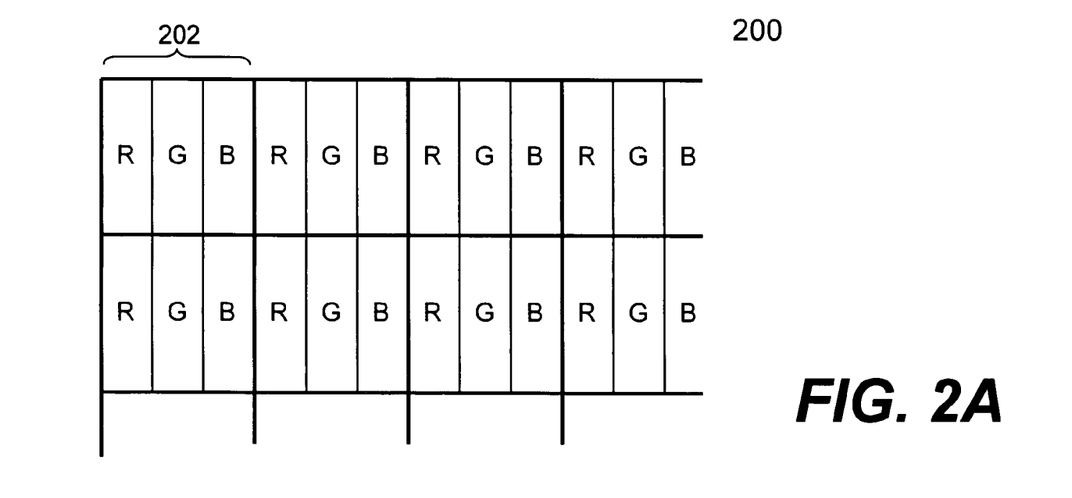
FIG. 2A shows an exemplary LCOS chip according to one embodiment of the present invention.
Figure 2B:
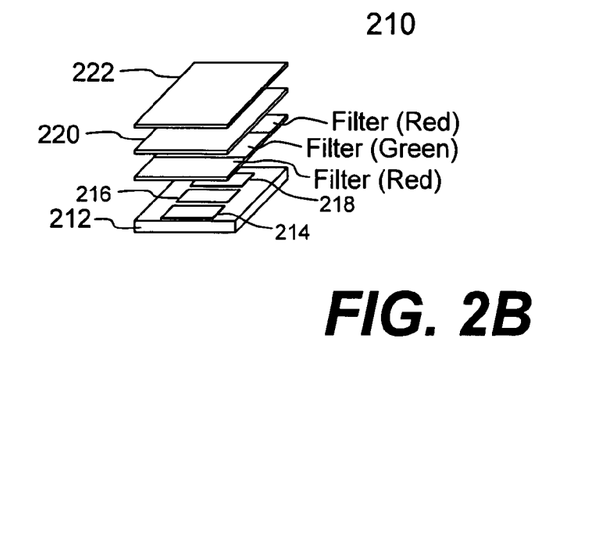
FIG. 2B shows an exemplary structure of a pixel group that may be used in the chip of FIG. 2A.

Referring now to the drawings, in which like numerals refer to like parts throughout the several views. FIG. 2A shows an exemplary LCOS chip 200 according to one embodiment of the present invention. The chip 200 includes an array of group pixels, each of the group pixels includes three colored pixels referenced as R, G, and B. In other words, the pixels in a group pixel 202 are covered with corresponding color filters. In one embodiment, three primary colored filters Red (R), Green (G) and Blue (B) are used. FIG. 2B shows an exemplary structure 210 of a pixel group that may be used in the chip 200 of FIG. 2A. Three pixels 214, 216 and 218 are layered on a substrate 212, for example, formed through a CMOS process. On top of the three pixels 214, 216 and 218, there are a filter layer 218, a seal layer 220 and a liquid crystal layer 222. The filter layer 218 includes three kinds of filters, red (R), green (G) and blue (B) filters respectively coincided with the three pixels 214, 216 and 218, resulting in three pixels in a pixel group.

In one embodiment, the size of the pixels 214, 216 and 218 is made rectangular with width being one third of its height. As a result, three closely positioned pixels 214, 216 and 218 make a nearly squared group pixel. If it is for high-definition television (HDTV) with a resolution of 1920 by 1080, the LCOS chip in accordance with the present invention will have 1920×3 by 1080 pixels. By the LCOS chip, an optical engine designed therefor can be greatly simplified. Unlike the prior art system that would employ a complicated optical engine to produce three colored images for combination and projection, a television system employing the LCOS of the present invention needs an optical engine that requires no separated colored images for combination.

Figure 2C:
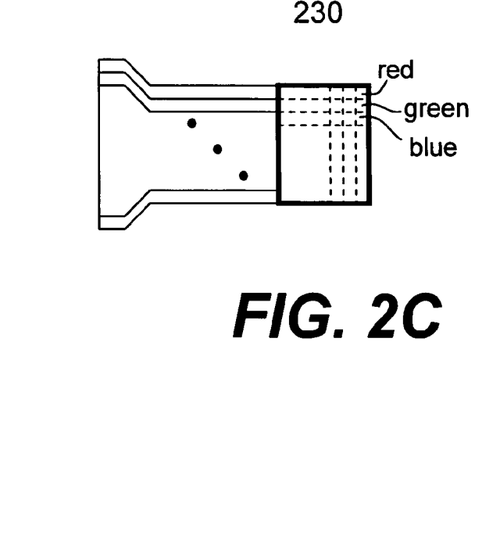
FIG. 2C shows an exemplary external layout of an LCOS microdevice according to one embodiment of the present invention, where an color image is directly produced via three types of color filters (e.g., red, green and blue)

FIG. 2C shows an exemplary external layout of an LCOS microdevice according to one embodiment of the present invention. With the on-chip colored filters (e.g., red, green and blue), a color image can be directly produced and projected onto a screen.

Figures 3, 4:
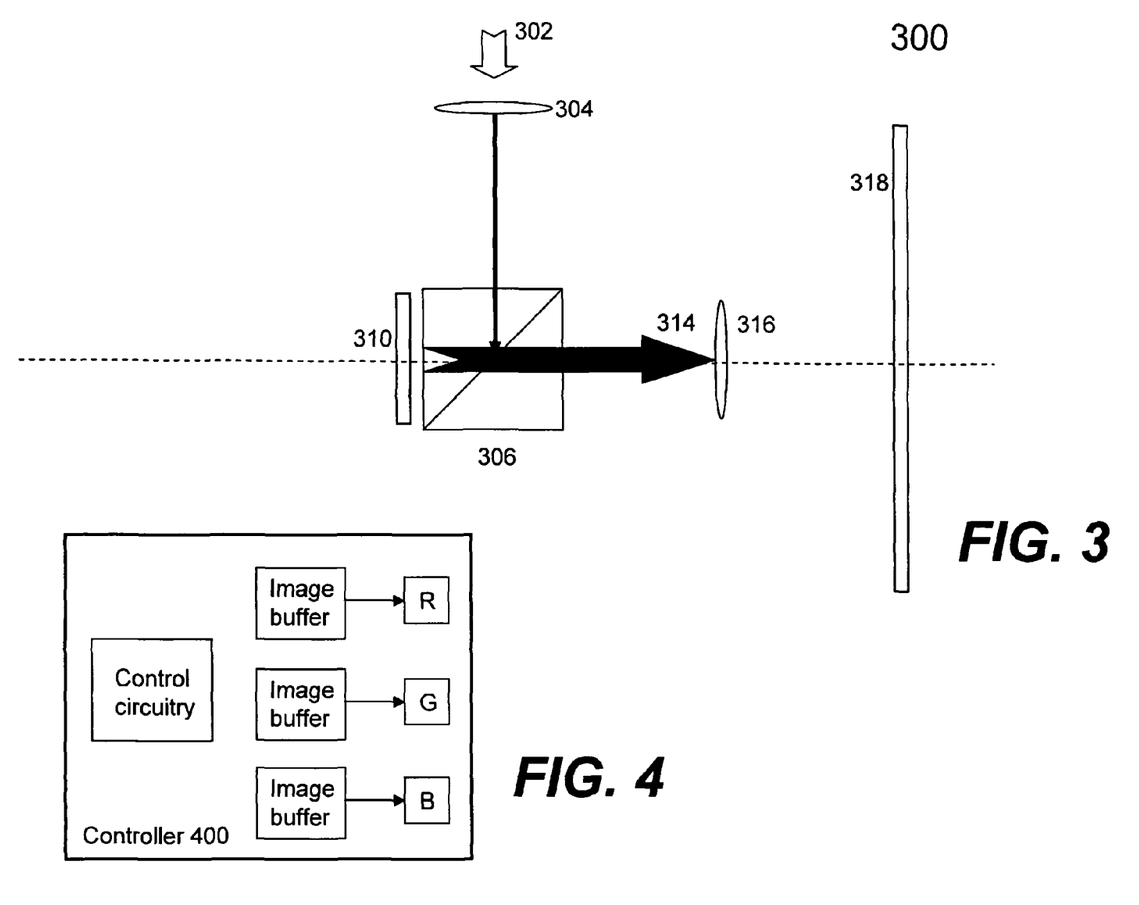
FIG. 3 shows an exemplary LCOS system employing a single LCOS microdevice using the LCOS chip of FIG. 2A and an optical engine to form an image for projection onto a display screen.
FIG. 4 shows a controller including at least three buffers buffering data to drive the LCOS chip 200 of FIG. 2A more than once to increase brightness of perceived image projected on the display screen.

FIG. 3 shows an exemplary LCOS system employing a single LCOS microdevice using the LCOS chip of FIG. 2A and an optical engine to form an image for projection screen 318. A lamp (not shown) produces a beam of white light that passes through a condenser lens. The light is focused and directed to pass through a filter 304 that only allows visible light to pass through. The filtered light is reflected by a reflector 306 onto an LCOS microdevice 310. Because the LCOS microdevice 310 in accordance with the present invention reflects a full color image 314, there would no need to split colored lights or combine colored images. A projection lens 316 is provided to magnify the image 314 and project it on the screen 318. As a result, the light engine is greatly simplified.

Besides the overall cost of such a system is much lower than that of the corresponding one shown in FIG. 1, these is no required precise alignment of the optical components in such a system, the assembly of such a system is also simplified.

It is described above that the size of the individual pixels is somehow limited by the size of a group pixel. It is likely that the brightness of a projected image may not be as bright as that in the system of FIG. 1, if the same light source is used. To increase the brightness of the projected image, a controller designed to drive the LCOS chip 200 is shown in FIG. 4 according to one embodiment of the present invention. The controller 400 includes three image buffers, one for one type of pixels in the LCOS chip. Thus there are three types of pixels in the exemplary LCOS chip 200 of FIG. 2A. In operation, when video signals are processed and received in the controller 400, the video signals are separated into three colored video signals (e.g., red, green and blue), if the video signals are not already separated.

As the LCOS chip 200 of FIG. 2A uses three types of color filters, there are three types of pixels. Although they are in general "red" pixels, "green" pixels, and "blue" pixels due to the corresponding color filters, other possible color filters may be used as well. To drive each type of pixels, the LCOS chip provides corresponding pins to receive proper signals. Collectively, the LCOS chip is assumed to have three types of pins, each designated to one type of signal (e.g., a signal to drive "red", "green" or "blue" type of pixels).

For each frame, the corresponding image data is buffered in one of the image buffers for a predefined time. Unlike the prior art system in which an image buffer is used to buffer image data to drive a display device only once, the image buffer in the controller 400 is caused to drive the LCOS chip more than once. In other words, the same data is used more than once to drive the LCOS chip. The perceived result is an accumulatively brighter image as human eyes are accumulative in perception. In operation, three colored images are respectively stored in the three buffers in the controller 400. These three buffers drive the LCOS chip at the same time more than once (e.g., twice or three times), essentially, the same signals are displayed more than once before flashed out by a next set of data or signal.

Figure 5A:
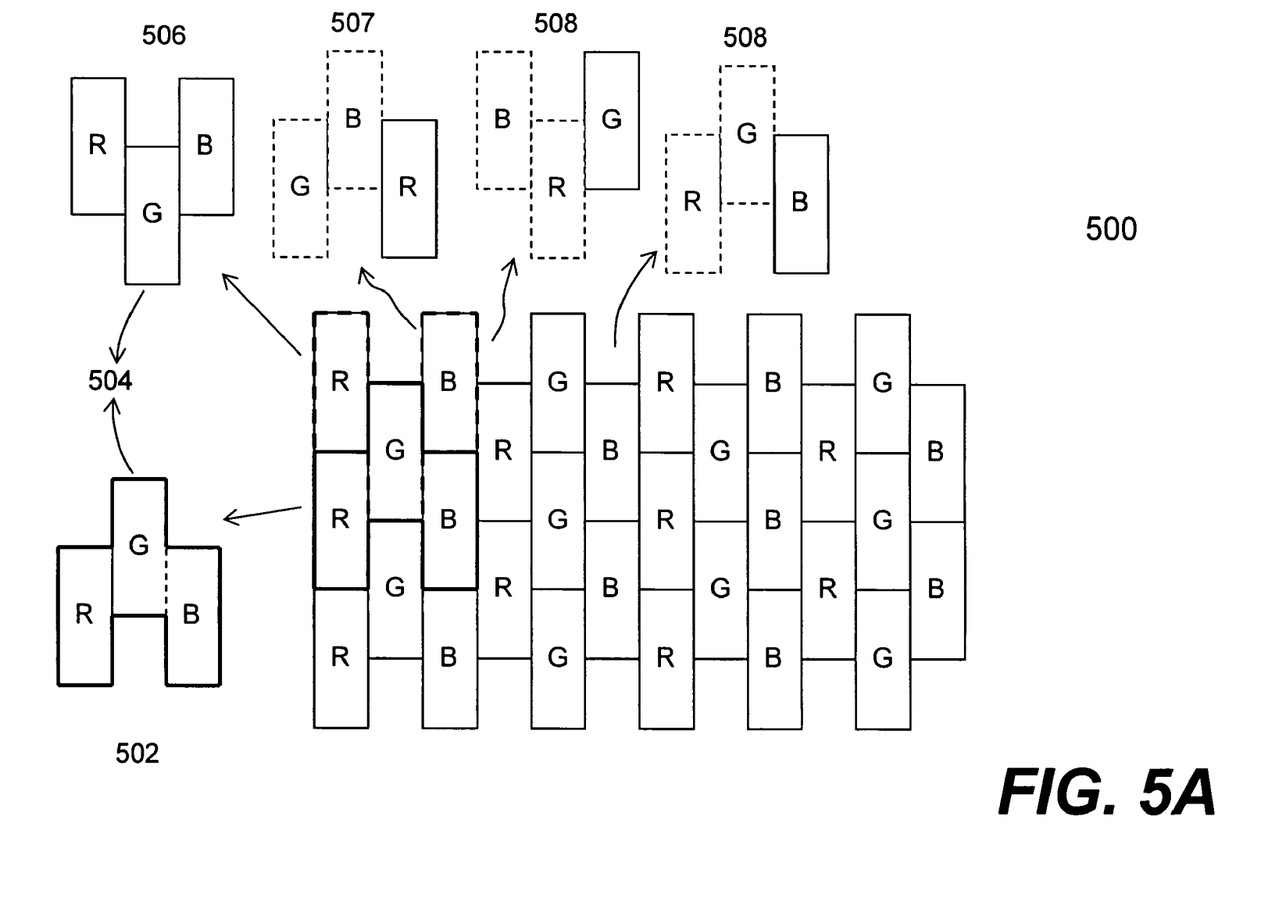
FIG. 5A shows an exemplary layout of pixels according to another embodiment, wherein the rows of the pixels in each pixel group is shifted by a half of pixel size, compared to FIG. 2A

FIG. 5A shows an exemplary layout 500 of the pixels according to another embodiment. Compared to FIG. 2A, the rows of the pixels in each pixel group is shifted by a half of pixel size. As shown in FIG. 5A, a group pixel is now made up with three pixels, one of which is being shared with an adjacent group pixel. For example, a group pixel 502 includes three pixels labeled respectively as R, G, and B, where the G pixel 504 is one of the three pixels in the group pixel 506. Likewise, the G pixel in the group pixel 506 is one of the three pixels in the group pixel 508. It can be appreciated that one of the advantages and benefits of the color filters as arranged in FIG. 5A is an increased spatial resolution an LCOS microdevice may offer. Given the same size of an LCOS microdevice, the spatial resolution is doubled. For example, an area of 4 by 4 group pixels of FIG. 2A may present 8 by 8 group pixels according to the filter arrangement in FIG. 5A. In other words, an LCOS microdevice configured for a resolution of 640 by 360 or 1920 by 1080 may project a resolution of 1280 by 720 or 3840 by 2160 according to the filter arrangement in FIG. 5A.

According to one embodiment, to maintain a resolution requirement but keep the same size of an LCOS chip, the size of the pixels may be enlarged by the filter arrangement in FIG. 5A. As a result, the brightness of the resultant LCOS microdevice may be enhanced.

Figure 5B:
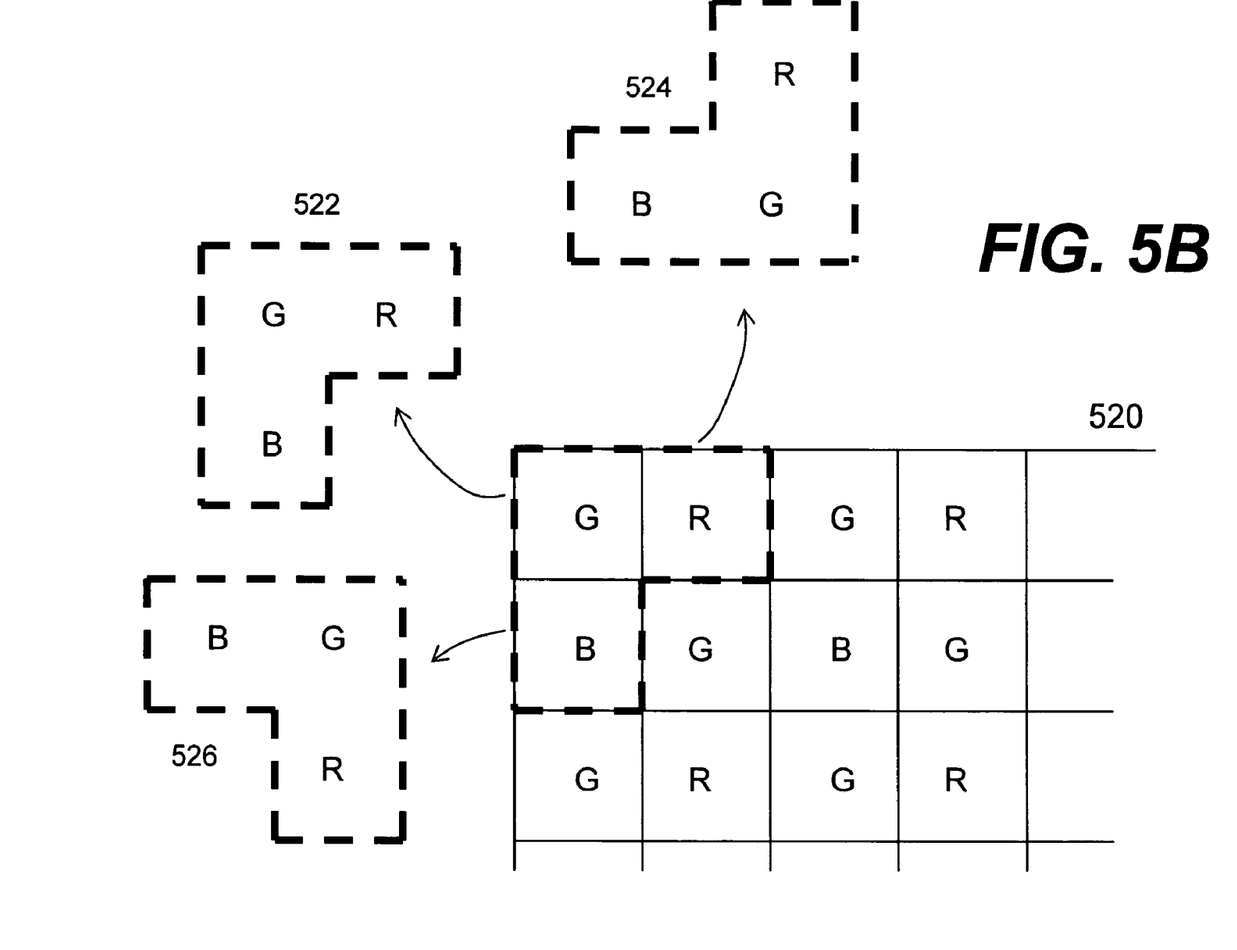
FIG. 5B shows an exemplary layout in consideration of increasing the display intensity without increasing the chip size or the size of individual pixels.

The layout 500 of FIG. 5A is disclosed in consideration of increasing display resolutions without increasing chip size. FIG. 5B shows an exemplary layout 520 in consideration of increasing the display intensity without increasing the chip size or the size of individual pixels. The filter pattern in the layout 520 is 50% green, 25% red and 25% blue, hence is also called RGBG or GRGB. In one embodiment, each of group pixels is formed by three of pixels in the layout 520. For example, a first group pixel 522 is formed by three adjacent RGB pixels, a second group pixel 524 is formed by three adjacent RGB pixels, one of which is shared from the first group pixel 533, and another one of which is share from a third group pixel 526 that is also formed by three adjacent RGB pixels. In a sense, a group pixel is enlarged three times by taking the advantages of two neighboring pixels.

Figure 5C:
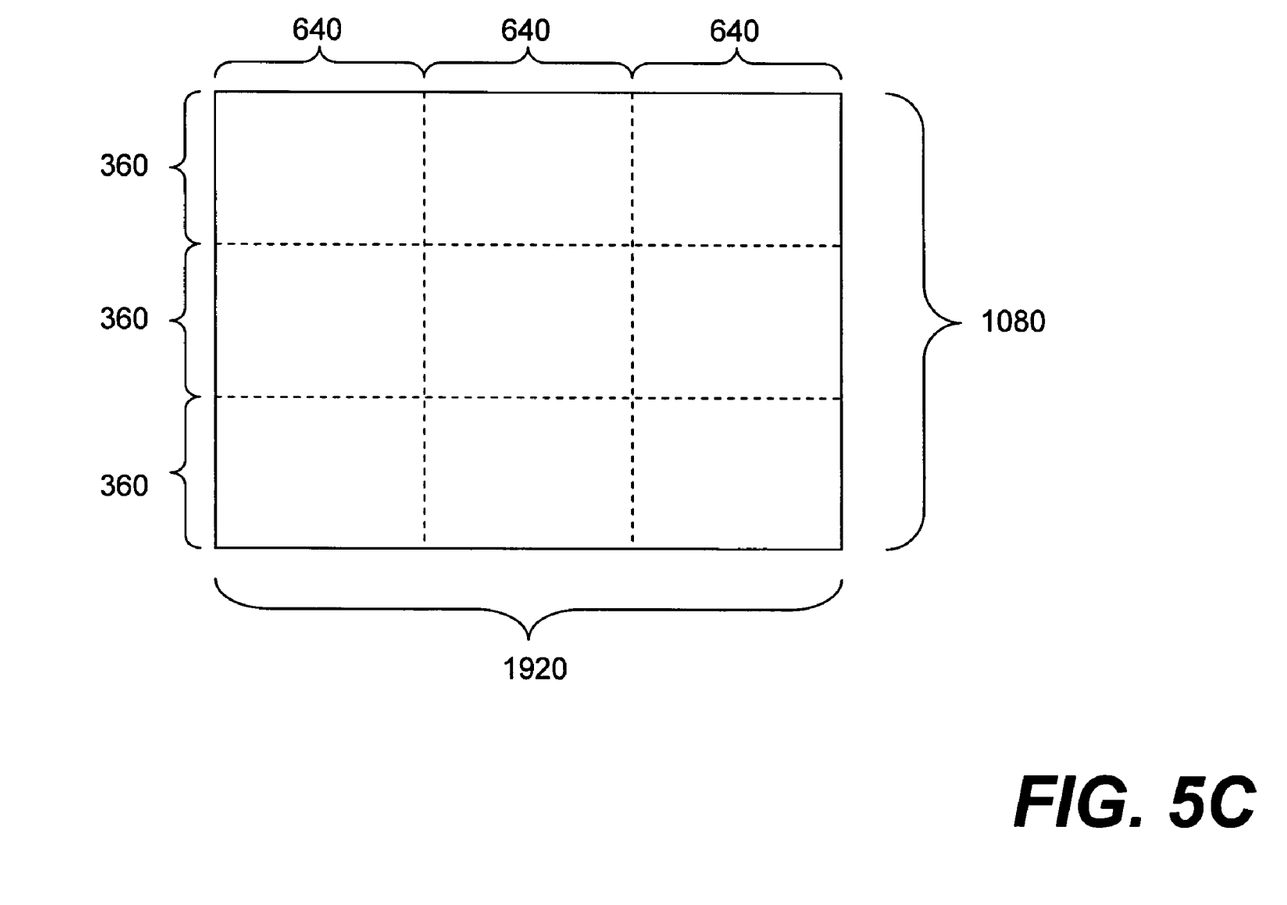
FIG. 5C shows a corresponding filter layer that is flexible enough to accommodate various sizes.

FIG. 5C shows an example of a filter layer 520 that may be cut to accommodate a specially required size. For example, the filter layer 520 is designed for a resolution of 1920 by 1080. The filter layer may be cut into 9 pieces of smaller filter layers, each for a resolution of 640 by 360. According to the filter arrangement of FIG. 5A, the smaller filter layer can be used in a LCOS microdevice to provide a resolution of 1280 by 720.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the forgoing description of embodiments.

I claim:

1. A Liquid Crystal on Silicon (LCOS) system comprising:
an LCOS microdevice including an array of group pixels, each of the group pixels including three pixels respectively covered by three types of color filters;
three allocated buffers, each being buffered with one of three primary colored images forming a color image to be displayed, each of the three primary colored images driving one of the three pixels in each of the group pixels, wherein data of the color image is used three times sequentially to drive the LCOS microdevice; and
an optical engine receiving a white light and projecting the white light onto the LCOS microdevice that reflects the three primary colored images respectively onto a display screen to achieve an accumulatively perceived bright display.

2. The LCOS system of claim 1, wherein the three primary colors are in red, green and blue.

3. The LCOS system of claim 2, wherein each of the three pixels is substantially in a rectangular shape, and one group pixel formed by the three pixels is substantially in a square shape.

4. The LCOS system of claim 3, wherein two types of pixels in two adjacent rows or columns are off by a half of one of the pixels.

5. The LCOS system of claim 2, wherein the three pixels are repeatedly arranged according to a predefined pattern.

6. The LCOS system of claim 1, wherein sizes of each of the pixels are limited by sizes of one of the group pixels.

7. The LCOS system of claim 1, further including a video controller including at least three buffers, each designated to drive one type of the pixels.

8. The LCOS system of claim 7, wherein the video controller is configured to separate the color image into the three primary colored images and store the three primary colored images into the three buffers respectively.

9. The LCOS system of claim 1, wherein the white light is produced by a lighting source thought a filter.

10. A Liquid Crystal on Silicon (LCOS) system comprising:
an LCOS microdevice including an array of group pixels, each of the group pixels including at least three pixels respectively covered by at least three types of color filters, resulting in at least three groups of colored pixels, each of the groups of colored pixels being driven by one image buffer caching one part of an image to be displayed, wherein the LCOS microdevice is driven at least three times to make the image look accumulatively bright, one of the at least three pixels in one of the group pixels is one of the at least three color pixels in an adjacent one of the group pixels; and an optical engine receiving a white light and projecting the white light onto the LCOS microdevice that reflects the image, the optical engine projecting the image onto a display screen.

11. The LCOS system of claim 10 further comprising a filter layer including the three types of color filters arranged in such a way that one type of the color filters is in one of three separate columns or rows.

12. The LCOS system of claim 11, wherein one type of the color filters in one of the three separate columns or rows is next to another type of the color filters in an adjacent one of the three separate columns or rows by an offset substantially close to a half of a size of a color filter.

13. The LCOS system of claim 12, wherein a resolution of the LCOS microdevice is doubled comparing to a configuration in which the offset is zero.

14. The LCOS system of claim 12, wherein the filter layer is flexible enough to be cut according to a special size requirement.

* * * * *